Oct. 4, 1960

G. J. SCHERER 2,954,637

CLAMPING DEVICE FOR FASTENING SCUFF PLATE
AND BUMPER TO CHAIR LEGS

Filed Nov. 19, 1958

INVENTOR.
George J. Scherer.

BY Fishburn & Gold
ATTORNEYS.

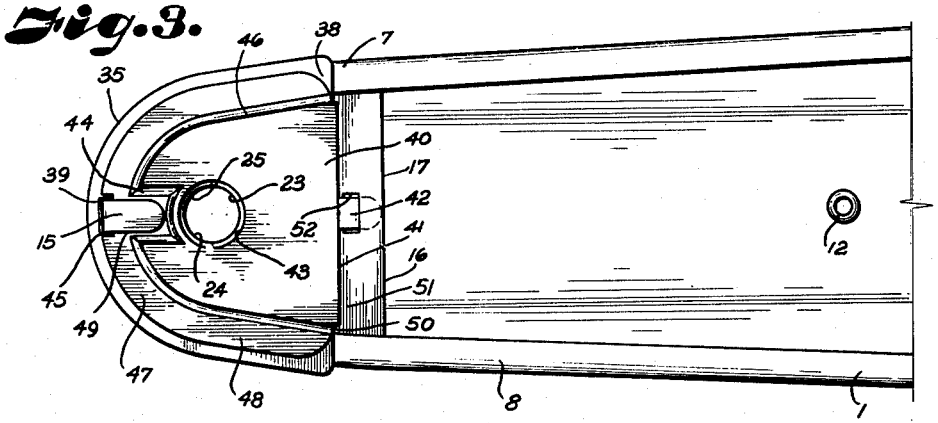
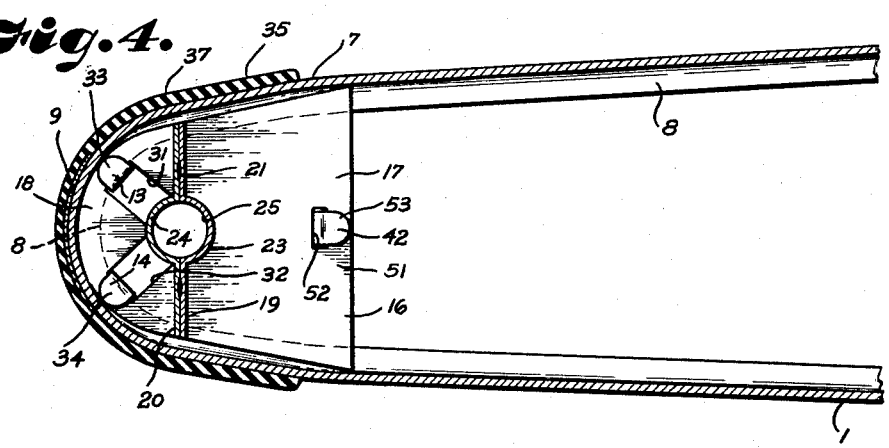
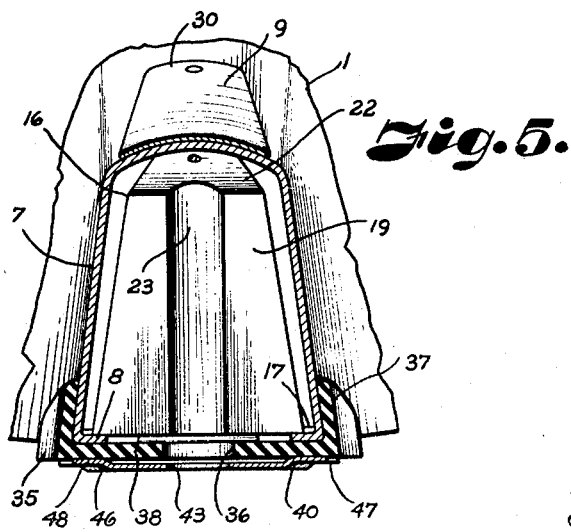

United States Patent Office 2,954,637
Patented Oct. 4, 1960

2,954,637

CLAMPING DEVICE FOR FASTENING SCUFF PLATE AND BUMPER TO CHAIR LEGS

George J. Scherer, Kansas City, Kans., assignor to Cramer Posture Chair Company, Inc., Kansas City, Mo., a corporation of Missouri Filed Nov. 19, 1958, Ser. No. 775,041

5 Claims. (Cl. 45—137)

This invention relates to a clamp for chair leg bumpers, and more particularly to a device for fastening bumpers to chair legs and mounting of the casters therein.

It has been found in making chairs of this type, wherein the base has radially extending legs made from channel members of substantially U-shape in cross-section, that there are rough edges, particularly when chairs are made of metal, and it is necessary to protect objects in the room and even the wearing apparel of a person using the chair from damage when coming in contact with the metal corners of the legs. In attempting to accomplish this purpose, various devices have been devised for placement over the outer end of the chair legs and various attempts have been made to provide a simple device of this character. Such attempts have apparently not been entirely successful.

It is therefore the principal object of the present invention to provide a clamp for a bumper and guard or scuff plate and mounting of the caster thereto in the extreme outer portion of the legs of a chair, the scuff plate generally being stainless steel, plastic or similar material, which includes a cover for the lower flange edges of the rear portion thereof.

Other objects of the present invention are to provide a clamping member for a bumper and guard or scuff plate which includes a caster mounting member having a socket for receiving the shank of the caster; to provide a caster mounting member having the socket therein and having slots for receiving tongues on the scuff plate for holding the same on the legs; to provide a rubber bumper member which fits over the bottom of the caster mounting member and having an upstanding flange engaging the scuff plate; to provide means on the scuff plate cooperating with the rubber bumper member for holding the same in place; to provide a clamping or locking plate engaging under the rubber bumper member having a recess for receiving a tongue on the scuff plate to hold the same in place at the rear and a tongue at the forward end engaging through an opening in the caster mounting member to hold the parts together, and to provide a device of this character simple and economical to manufacture.

In accomplishing these and other objects of my invention, I have provided improved details of structure the preferred forms of which are illustrated in the accompanying drawings, wherein:

Fig. 3 is a bottom plan view of the device shown in assembled condition without the caster.

Fig. 4 is a cross-sectional view taken on a line 4—4 (Fig. 2).

Fig. 5 is a cross-sectional view taken on a line 5—5 (Fig. 2).

Referring more in detail to the drawings:

1 designates a leg of a chair (not shown) to which is attached a caster 2 having a shank 3. The caster wheel 4 is usually secured to the shank 3 by mechanism including ball bearing 5 for easy rotation of the caster wheel with respect to the shank 3.

Figure 1:
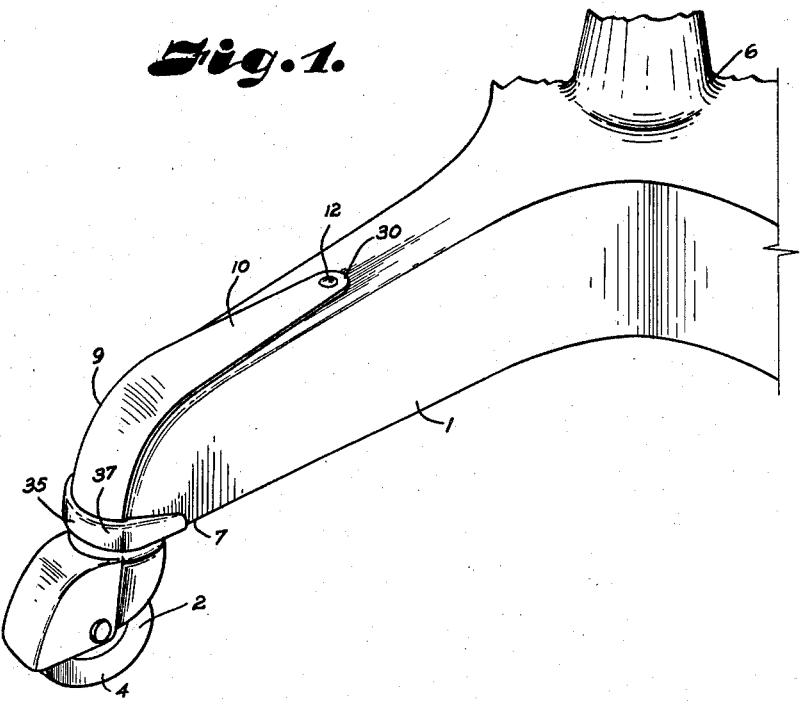
Fig. 1 is a fragmentary perspective view of a chair base and leg showing my clamping device attached thereto.
Figure 2:
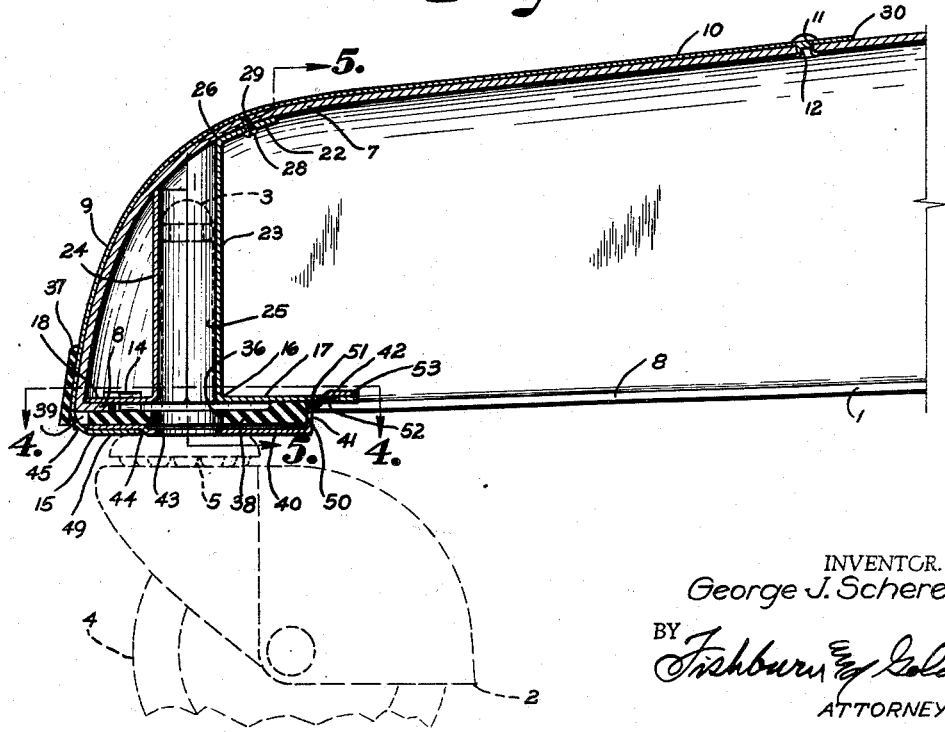
Fig. 2 is a longitudinal section therethrough showing the caster in dotted lines.
Figure 6:
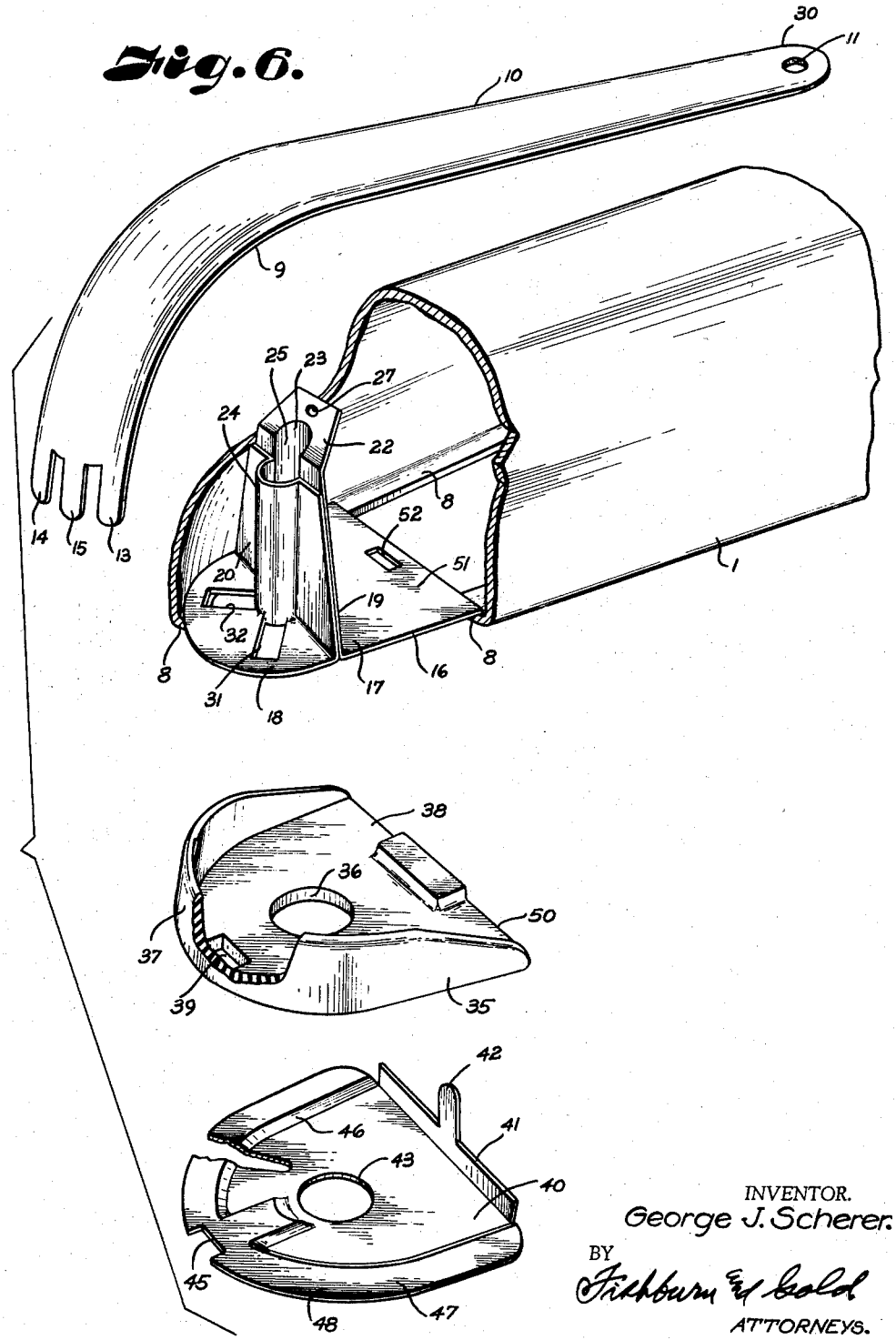
Fig. 6 is a disassembled perspective view of my clamping device particularly illustrating the parts making up the same.

The legs of the chair are generally channel or U-shaped in cross-section and taper slightly inwardly from the base 6 thereof toward the outer ends 7 and have an inwardly turned flange 8 on the bottom edge thereof which extends completely to the outer end thereof, as illustrated in Fig. 2. 9 designates the scuff plate or protector for the extreme outer end and top of the legs which is generally of swivel chair type. The scuff plate is elongated as indicated at 10 in Fig. 1 and has an opening 11 at its inner end for receiving a rivet or the like 12 for securing the same to the leg of the chair at the outer end. The other or outer end is curved downwardly as best illustrated in Fig. 6 and has tongues 13, 14 and 15 extending downwardly from the curved portion.

A caster mounting member 16 comprising bottom plates 17 and 18 are provided having upwardly extending walls 19 and 20 back to back and near the center thereof are secured together by welding or other suitable means as indicated at 21 (Fig. 4). The wall 19 is bent inwardly forming a flange 22 (Fig. 6) and both walls 19 and 20 are curved outwardly away from each other at their longitudinal centers as indicated at 23 and 24, forming a socket 25 for the shank 3 of the caster 2.

The caster mounting member 16 is inserted in the U-shaped channel of the legs 1 and pressed to the outer end of the leg until the tapered flange 22 engages against the inner wall of the leg as indicated at 26 (Fig. 2). The flange 22 is provided with an opening 27 for receiving a screw or the like 28 for engaging in a threaded opening 29 of the leg to hold the caster mounting plates in position as illustrated in Fig. 2. The scuff plate 10 is then placed over the leg and the rivet 12 inserted in the opening in the leg to hold the end 30 in place and the tongues 13 and 14 are bent around flange 8 and inserted through slots 31 and 32 respectively in the bottom plate 18 of the caster mounting member and the ends of the tongues are bent outwardly against the bottom side of the plate as indicated at 33 and 34 (Fig. 4) to hold the scuff plate to the caster mounting member.

A bumper member 35 preferably made of rubber or other similar material is provided for engaging against the lower face of the caster mounting member 16 and is provided with an opening 36 for receiving the shank 3 of the caster. The rubber member 35 has an upwardly extending flange 37 and the bottom 38 of the rubber member has an opening 39 near its rear edge for receiving the tongue 15 of the scuff plate 9 as will later be shown.

40 designates a clamping plate which engages underneath the rubber bumper member 35 and is provided with an upstanding flange 41 at its forward edge and a tongue 42. It has an opening 43 through which the shank 3 of the caster extends and a recess 44 extending longitudinally rearwardly of the plate in alignment with a notch or the like 45. The plate 40 is provided with an upwardly extending portion 46 and a laterally extending portion 47 providing a flange 48 around the sides and back of the plate and the notch 45 is in that flange.

When the clamping plate is placed over the rubber member 35 the tongue 15 on the bumper member 9 extends through the opening 39 in the rubber member and engages in the notch 45 of the clamping plate and is bent forwardly to lie in the recess 44 as indicated at 49 (Figs. 2 and 3), to thus securely clamp and hold the plate 40, rubber member 35 and scuff plate 9 securely to the caster mounting member 16 and thus hold the entire assembly together. The flange 41 engages against the forward edge 50 of the rubber member and engages the underneath side of the plate 17 near the forward edge 51 thereof as illustrated in Fig. 2. The tab 42 extends through an opening 52 in the plate 17 and is bent forwardly as indicated at 53 to hold the forward end of the plate 40 and rubber member 35 in assembled condition with the caster mounting member.

The shank 3 of the caster is pressed into the socket 25 and the caster wheel 4 is rotatably mounted on the shaft as is the usual practice, through the ball bearing member 5.

It will be obvious from the foregoing that I have provided an improved clamping means for chair leg bumpers and mounting of the casters therein which is simple and easy to assemble and will protect the furniture and other objects in a room, as well as a person's clothing and wearing apparel when using the chair.

What I claim and desire to secure by Letters Patent is:

1. Apparatus for attaching scuff plates and casters having a shank to the legs of a chair base, said legs extending radially from the base of said chair and said legs having a top and depending sides and an end wall with inturned flanges on the lower edges of said sides and end wall, mounting plates for the casters, each of said plates including a bottom and a vertically extending socket for receiving the shank of the caster, said mounting plate fitting in the end of said leg with the bottom resting on said flanges, the bottom of the mounting plate having diagonally extending slots rearwardly of the vertical socket and a slot near the forward edge of said bottom, said scuff plate having an elongated portion engaging the top of the legs and a downwardly curved outer end to fit the end of the legs and having a plurality of depending tongues on the lower edge of the outer end portion, at least one of said tongues engaging in one of the slots of the mounting plate and being bent to secure the scuff plate thereto, a resilient bumper having a bottom for engaging the bottom of the mounting plate and having an upwardly extending flange on its sides and rear portion for engaging said scuff plate and the sides of the legs, said bumper having a central opening in its bottom for receiving the shank of the caster and an opening in the bottom near the rear edge for receiving one of the tongues of said scuff plate, and a clamping plate having a recessed bottom portion for engaging the bottom of the bumper member, said clamping plate having a laterally extending flange on its sides and rear portion, a notch in the rear portion of the flange, an upwardly extending flange on the forward edge having a tongue thereon, one of the tongues on the scuff plate engaging through the opening in the rear of the bottom of the bumper and in said notch in the clamping plate and being bent to engage the bottom of the clamping plate and the tongue on the clamping plate extending through the opening in the forward portion of the mounting plate and bent to secure the clamping plate to said mounting plate.

2. Apparatus for attaching scuff plates and casters having a shank to the legs of a chair base, said legs extending radially from the base of said chair and said legs having a top and depending sides and an end wall with inturned flanges on the lower edges of said sides and end wall, mounting plates for the casters, each of said plates including a bottom and vertically extending walls near the center thereof, said walls having oppositely facing semi-circular vertical portions forming a socket for receiving the shank of the caster, said mounting plate fitting in the end of a leg of the chair with the bottom resting on said flanges, means on one of the vertically extending walls for securing the mounting plate to said leg, the bottom of the mounting plate having slots extending diagonally outwardly and rearwardly of the vertical walls and a slot near the forward edge of the bottom, said scuff plate having an elongated portion engaging the top of the leg and a downwardly curved outer end to fit the end of the leg and having a plurality of depending tongues on the lower edge of the outer end portion, at least one of said tongues engaging in one of the slots rearwardly of the walls of the bottom of the mounting plate and being bent to secure the scuff plate thereto, a resilient bumper having a bottom for engaging the bottom of the mounting plate and having an upwardly extending flange on its sides and rear portion for engaging said scuff plate and the sides of the leg, said bumper having a central opening in its bottom for receiving the shank of the casters and a slot in the bottom near the rear for receiving one of the tongues on said scuff plate, and a clamping plate having a recessed bottom portion for engaging the bottom of the bumper member, said clamping plate having a laterally extending flange on its sides and rear portion, a notch in the rear portion of the flange, an upwardly extending flange on the forward edge having a tongue thereon, one of the tongues on the scuff plate engaging in said notch and being bent to engage the bottom of the clamping plate and the tongue on the clamping plate extending through the opening in the forward portion of the mounting plate and bent to secure the clamping plate to said mounting plate.

3. In combination with a chair having radially extending legs having a top and depending sides and an end wall with an inturned flange on the lower edge of said sides and end wall and a caster mounting member secured in the ends of each of said legs and an elongated scuff plate fitting over the outer top portion and the end wall of each of said legs and a resilient bumper member engaging under said caster mounting member and having a flange engaging the outer face of the end of the scuff plate, a clamping plate for securing said bumper member and scuff plate to said caster mounting member and leg, said clamping plate including a depressed portion engaging over said bumper member and having a horizontally extending flanged portion around the sides and rear portion thereof, an upwardly extending flange on the forward edge thereof provided with a tongue, the caster mounting member having spaced slots near the rear portion thereof and an opening near the forward portion thereof, the bumper member having a slot near the rear portion of the bottom thereof, the horizontally extending flange on said clamping plate having a notch in the rear portion thereof aligning with the slot in said bumper member, and tongues on the portion of the scuff plate extending over the end wall of the legs extending through said spaced slots in the caster mounting member and bent along the under side of the caster mounting member, another tongue on the scuff plate extending through the slot in the bumper member and engaging in the notch in the rear edge of the clamping plate and bent along the under side thereof, said tongue on the flange on the forward edge of the clamping plate extending through the opening in the caster mounting member to hold the bumper member and scuff plate in assembled relation.

4. In combination with a chair having radially extending legs having a top and depending sides and an end wall with an inturned flange on the lower edge of said sides and end wall and a caster mounting member secured in the end of each of said legs and an elongated scuff plate fitting over the outer top portion and the end wall of each of said legs and a resilient bumper member having a bottom portion engaging under said caster mounting member and having a flange on the bottom engaging the outer face of the end of the scuff plate, a clamping plate for securing said bumper member and scuff plate to said caster mounting member and leg, said clamping plate including a depressed portion engaging over the bottom portion of said bumper member and a horizontally extending flanged portion around the sides and rear portion thereof, said caster mounting member having spaced openings in the bottom thereof and said bumper member having an opening near the rear edge thereof, means on said scuff plate engaging in some of the openings in the caster mounting member and in the opening in said bumper member, and the means on the clamping plate cooperating with means on the scuff plate and caster mounting member to hold the bumper member and scuff plate in assembled relation with said caster mounting member.

5. In combination with a chair having radially extending legs having a top and depending sides and an end wall with an inturned flange on the lower edge of said sides and end wall and a caster mounting member secured in the ends of each of said legs and an elongated scuff plate fitting over the outer top portion and the end wall of each of said legs and a resilient bumper member having a bottom portion engaging under said caster mounting member and having a flange engaging the outer face of the end of the scuff plate, said caster mounting member having a slot in the forward portion thereof, a clamping plate for securing said bumper member and scuff plate to said caster mounting member and leg, said clamping plate including a depressed portion engaging over the bottom portion of said bumper member and having a horizontally extending flanged portion around the sides and rear portion thereof and an upwardly extending flange on the forward edge thereof provided with a tongue, means on the caster mounting member cooperating with means on the scuff plate and engaging the bumper member to hold the same on the caster mounting member, and means on the scuff plate engaging a rear portion of the clamping plate and the tongue on the forward portion of the clamping plate extending through said slot in the caster mounting member and bent along the upper side of the caster mounting member to hold the bumper member and scuff plate in assembled relation with the caster mounting member.

References Cited in the file of this patent

UNITED STATES PATENTS

| | | |
|---|---|---|
| 720,882 | Buckman | Feb. 17, 1903 |
| 2,217,754 | Johnson | Oct. 15, 1940 |
| 2,603,909 | Pettibone | July 22, 1952 |
| 2,732,157 | Hamilton | Jan. 24, 1956 |